United States Patent
Huang et al.

(10) Patent No.: US 10,006,550 B2
(45) Date of Patent: Jun. 26, 2018

(54) PLUG MEMBER OF GAS VALVE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Yunlin County (TW)

(73) Assignee: GRAND MATE CO., LTD., Taichung (TW)

( * ) Notice: Subject to any disclaimer, the term of this patent is extended or adjusted under 35 U.S.C. 154(b) by 64 days.

(21) Appl. No.: 15/199,839

(22) Filed: Jun. 30, 2016

(65) Prior Publication Data

US 2017/0114908 A1    Apr. 27, 2017

(30) Foreign Application Priority Data

Oct. 26, 2015   (TW) .............................. 104135145 A (51) Int. Cl.
*F16K 5/22*    (2006.01)
*F16K 5/02*    (2006.01)

(52) U.S. Cl.
CPC ............ *F16K 5/222* (2013.01); *F16K 5/0207* (2013.01)

(58) Field of Classification Search
CPC ........ F16K 5/0207; F16K 5/103; F16K 5/106; F16K 5/222; F16K 5/0214; F16K 11/083; F23N 2035/16; F23N 2035/24; F23N 1/005

USPC .................................. 251/205–209, 309–311
See application file for complete search history.

(56) References Cited

U.S. PATENT DOCUMENTS

| | | | |
|---|---|---|---|
| 4,738,283 A * | 4/1988 | Shirai | F23N 1/005 137/624.11 |
| 6,845,966 B1 * | 1/2005 | Albizuri | F16K 5/162 137/599.17 |
| 8,925,898 B2 * | 1/2015 | Huang | F16K 5/0214 251/207 |

FOREIGN PATENT DOCUMENTS

TW    M276159    9/2005

* cited by examiner

*Primary Examiner* — Marina Tietjen
(74) *Attorney, Agent, or Firm* — Tracy M. Heims; Apex Juris, pllc.

(57) ABSTRACT

A plug member of gas valve has an axial bore, a first bore, and a second bore, wherein the first bore and the second bore are located in a radial direction of the plug member, and communicate with the axial bore, respectively. A diameter of the first bore is larger than that of the second bore. A first guiding slot and at least one first oil groove are recessed into the outer peripheral surface of the plug member, wherein the first guiding slot has a first end communicating with the first bore, and a second end near the second bore without physically communicating with the second end. The at least one first oil groove is near the second end of the first guiding slot without physically communicating with the first guiding slot or the second bore. Whereby, the first oil groove provides space for receiving lubricant.

12 Claims, 9 Drawing Sheets

PLUG MEMBER OF GAS VALVE

The current application claims a foreign priority to application number 104135145 filed on Oct. 26, 2015 in Taiwan.

BACKGROUND OF THE INVENTION

1. Technical Field

The present invention generally relates to a gas valve, and more particularly to a plug member of gas valve.

2. Description of Related Art

It's well known that a plug member installed in a gas valve is adapted to regulate the gas flow passing therethrough. Taiwan utility model patent M276159 discloses such a conventional plug member which is adapted to be installed in a main body of a gas valve, including a gas channel provided therein, wherein a first vent and a second vent communicating with the gas channel are provided on an outer wall of the plug member. A variable area slot is further provided on the outer wall of the plug member. The disclosed plug member is adapted to regulate gas flow passed through the gas valve in a nearly linear way, for the cross area of the variable area slot is specifically designed, wherein the first vent allows high gas flow to flow into the gas channel, the second vent allows low gas flow to flow into the gas channel, and the gas supply does not cut off while rotating the plug member between the first vent and the second vent.

Figure 1:
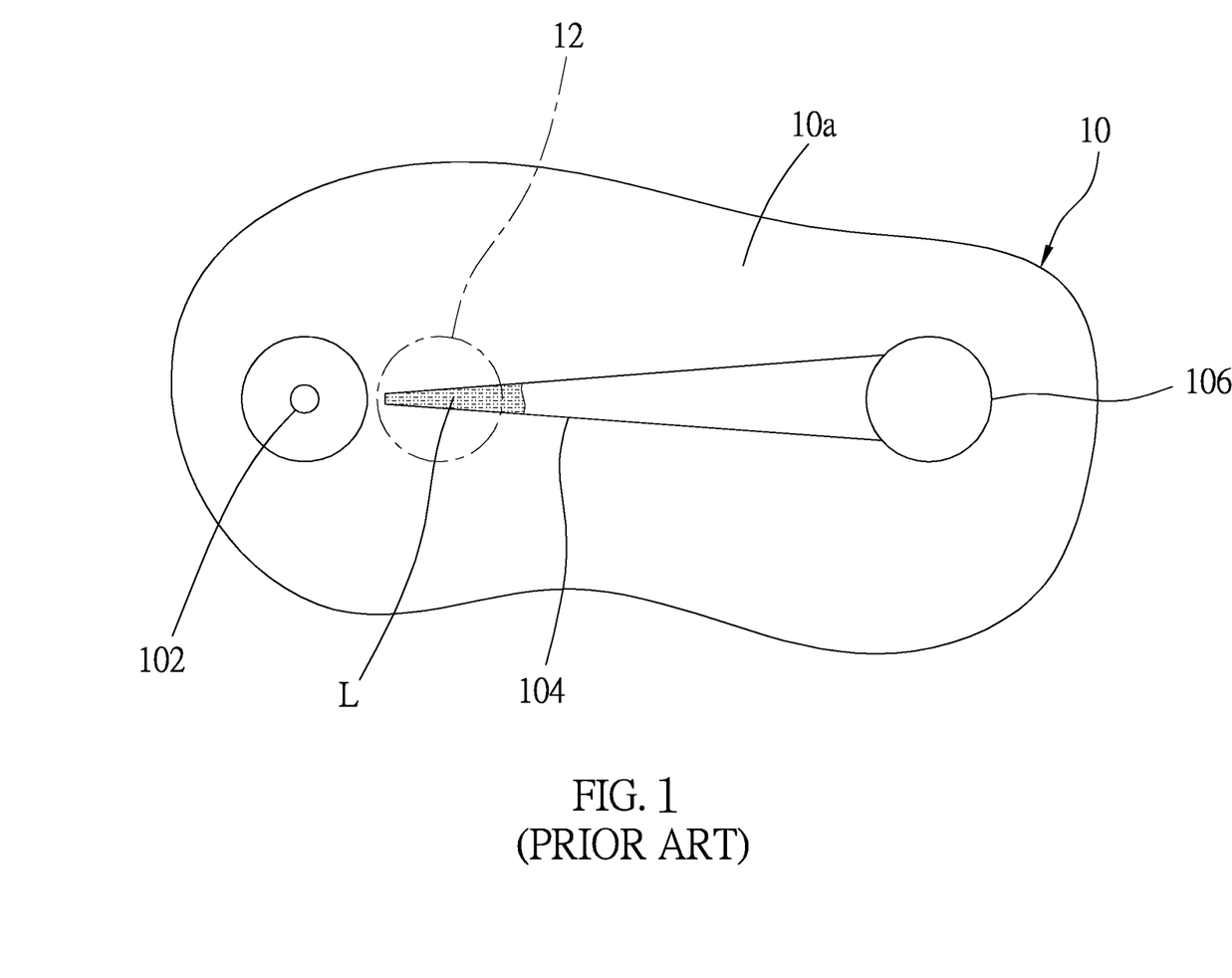
FIG. 1 is a partial expanded view of the outer peripheral surface of the conventional plug member.

As shown in FIG. 1, in practice, the lubricant is applied to an outer peripheral surface 10a of the plug member 10 to increase the lubrication between the plug member 10 and the main body of the gas valve. However, for the conventional plug member 10, a top margin of the variable area slot 104 near the second vent 102 is perpendicular to the rotating direction of the plug member 10, making lubricant accumulate in the variable area slot 104 at locations near the second vent 102. Once the lubricant accumulates too much, the gas channel would be blocked, which would cause the gas flow to drop dramatically or even to be cut off completely while rotating the plug member 10.

BRIEF SUMMARY OF THE INVENTION

In view of the reasons mentioned above, the primary objective of the present invention is to provide a plug member of a gas valve, wherein the plug member could prevent the gas flow from dropping dramatically or being cut off.

The present invention provides a plug member of gas valve, wherein the plug member has an axial bore located in an axial direction thereof, a first bore, and a second bore; the first bore and the second bore are located in a radial direction thereof. The first bore and the second bore communicate with the axial bore, respectively. A diameter of the first bore is larger than a diameter of the second bore. A first guiding slot and at least one first oil groove are recessed into an outer peripheral surface of the plug member, wherein the first guiding slot extends in a direction from the first bore toward the second bore. The first guiding slot has a first end and a second end, wherein the first end communicates with the first bore, while the second end is near the second bore without physically communicating with the second end; the at least one first oil groove is near the second end of the first guiding slot without physically communicating with the first guiding slot or the second bore.

With the aforementioned design, the at least one first oil groove provides space to receive lubricant, which reduces the amount of lubricant entering the first guiding slot, especially the second end. Whereby the condition of accumulating too much lubricant in the second end of the first guiding slot could be avoided. As a result, while rotating the plug member, the gas flow flowing therethrough could be prevented from dropping dramatically or being cut off.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 2:
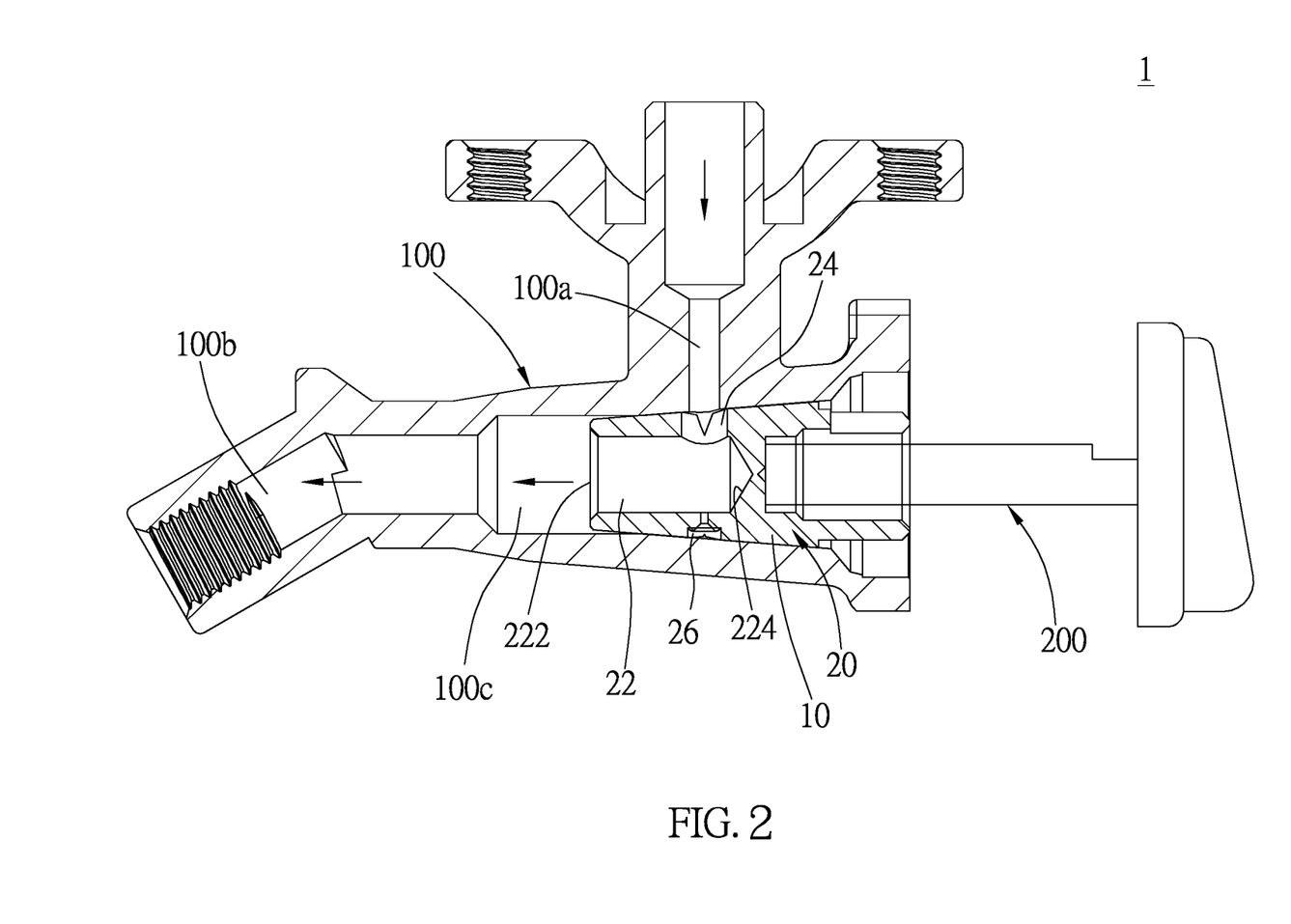
FIG. 2 is a sectional view of the gas valve applied with the plug member of a first embodiment of the present invention.
Figure 3:
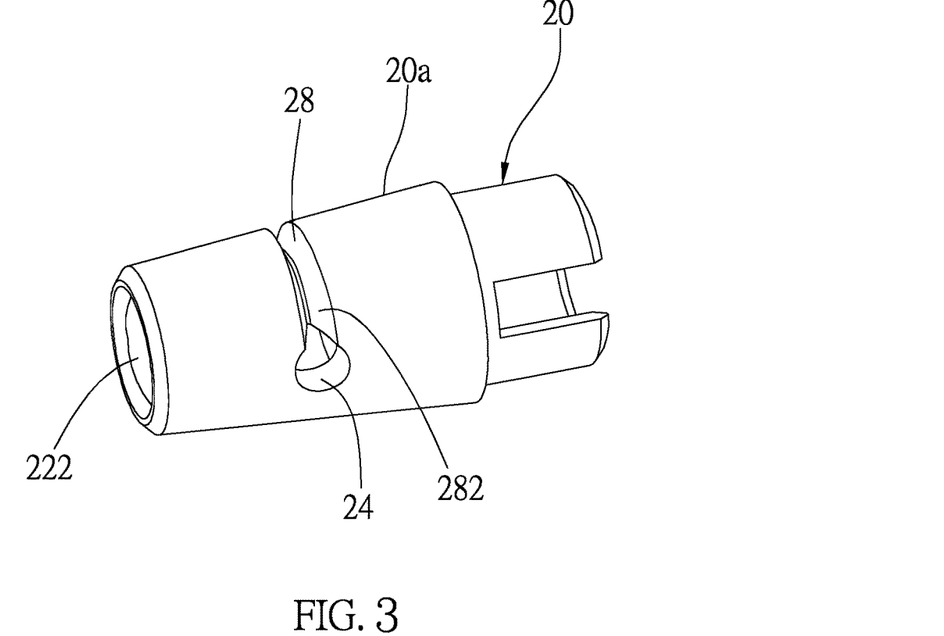
FIG. 3 is a perspective view of the plug member of the first embodiment.
Figure 4:
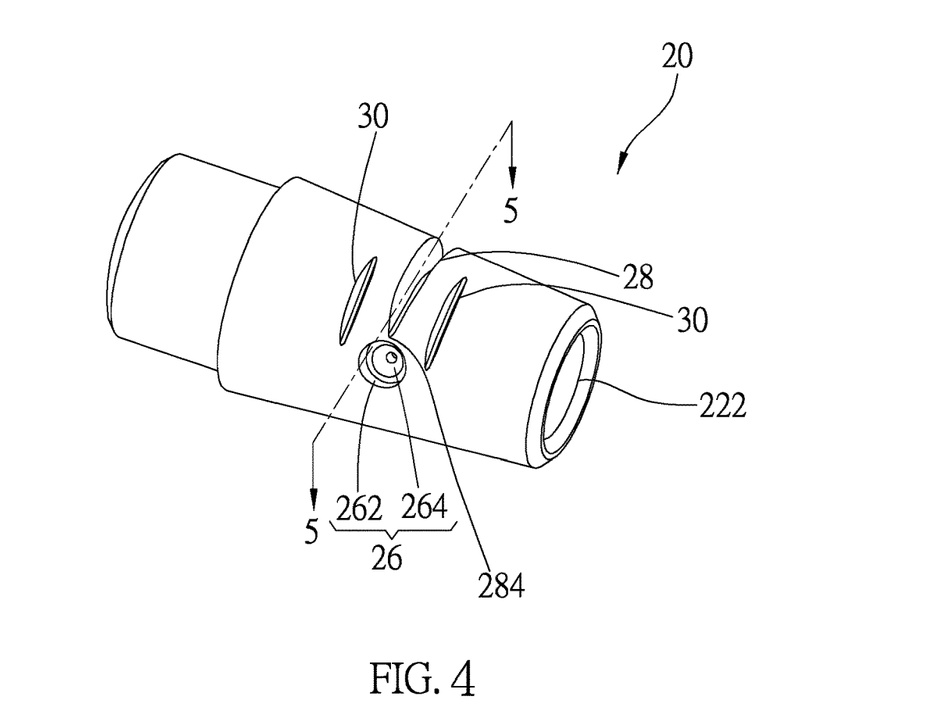
FIG. 4 is a perspective view, showing the plug member in another direction of the first embodiment.
Figure 5:
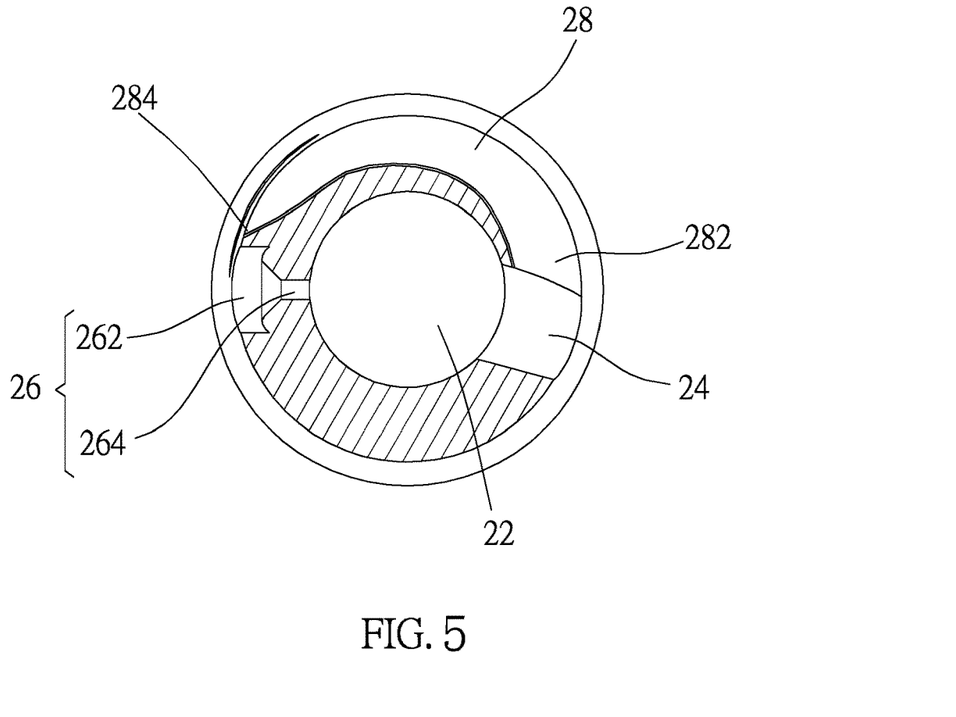
FIG. 5 is a sectional view along the 5-5 line of FIG. 4.

As shown in FIG. 2, a gas valve 1 with a plug member 20, which is the first embodiment of the present invention, has a valve 100 and a drive lever 200, wherein the drive lever 200 has a first airway 100a, a second airway 100b, and a chamber 100c communicating the first airway 100a and the second airway 100b. The plug member 20 is located in the chamber 100c of the valve 100, wherein lubricant is applied to an outer peripheral surface of the plug member 20 to make the plug member 20 rotate smoothly. The drive lever 200 is connected to the plug member 20 to rotate the plug member 20. In the first embodiment, gas flows in the gas valve 1 through the first airway 100a, and flows out through the second airway 100b. However, this is not a limitation of the present invention. Gas could flow in the gas valve 1 through the second airway 100b, and flow out through the first airway 100a in other embodiments.

As shown in FIGS. 3-6, the plug member 20 has an axial bore 22 located in an axial direction thereof, a first bore 24, a second bore 26, which are located in a radial direction thereof, a first guiding slot 28, and at least one first oil groove 30, which are recessed into the outer peripheral surface 20a of the plug member 20, wherein the number of the at least one first oil groove 30 is two in the first embodiment. The axial bore 22 has an open end 222 and a closed end 224, wherein the open end 222 corresponds to the second airway 100b of the gas valve 1. The first bore 24 and the second bore 26 communicate with the axial bore 22, respectively. In the first embodiment, the second bore 26 includes a first section 262 and a second section 264, wherein the second section 264 communicates with the first section 262. A cross-sectional diameter of the first section 262 is larger than a cross-sectional diameter of the second section 264, wherein the second section 264 has the smallest cross-sectional diameter, which is adapted to restrict gas flow that passes through the second bore 26. A diameter of the first bore 24 is larger than the cross-sectional diameter of the second section 264 of the second bore 26.

The first guiding slot 28 extends from the first bore 24 to the second bore 26 along the outer peripheral surface 20a, wherein an extension line I1 of the first guiding slot 28 passes through a center of the first bore 24 and a center of the second bore 26. The first guiding slot 28 has a first end 282 and a second end 284, wherein the first end 282 communicates with the first bore 24. The second end 284 is near the second bore 26 without physically communicating with the second bore 26. A width of the first end 282 is greater than a width of the second end 284, wherein the width decreases gradually from the first end 282 to the second end 284 to form a tip at the second end 284. A depth of the first guiding slot 28 decreases gradually from the first end 282 to the second end 284.

Both the first oil grooves 30 are near the second end 284 of the first guiding slot 28 without communicating with the first guiding slot 28 or the second bore 26. In the first embodiment, both the first oil grooves 30 are parallel to the axial direction of the plug member 20, wherein the second end 284 of the first guiding slot 28 is located between the first oil grooves 30. Preferably, the second end 284 of the first guiding slot 28 and part of the second bore 26 are located between the first oil grooves 30. The first oil grooves 30 are long and narrow, and an extension line I2 of each of the first oil grooves 30 in a long axial direction thereof is parallel to the extension line I1 of the first guiding slot 28. In other words, the long axial direction of each of the first oil grooves 30 is parallel to an extending direction of the first guiding slot 28.

Figure 6:
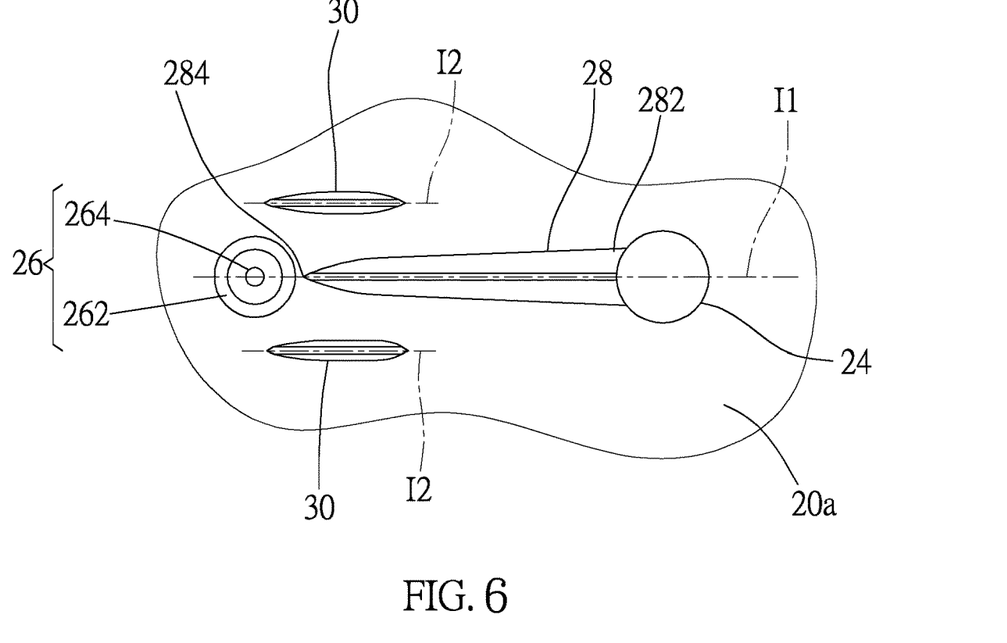
FIG. 6 is a partial expanded view of the outer peripheral surface of the plug member of the first embodiment of the present invention.

Due to the difference between the diameter of the first bore 24 and the cross-sectional diameter of the second section 264 of the second bore 26, and the variation of the width of the first guiding slot 28, the gas flow passing through the plug member 20 through the first airway 100a could be linearly regulated while rotating the plug member 20. In the first embodiment, the first oil grooves 30 do not enter a projection area of the first airway 100a. However, in practice, at least one part of each of the first oil grooves 30 could also enter the projection area of the first airway 100a while the plug member 20 is being rotated.

Due to the first oil grooves 30 provide space to receive lubricant, the amount of lubricant entering the first guiding slot 42, especially the second end 284, could be reduced. Whereby the problem of accumulating too much lubricant in the second end 284 of the first guiding slot 42 could be avoided. As a result, while rotating the plug member 20, the gas flow flowing through the plug member 20 would not drop dramatically or be cut off.

Figure 7:
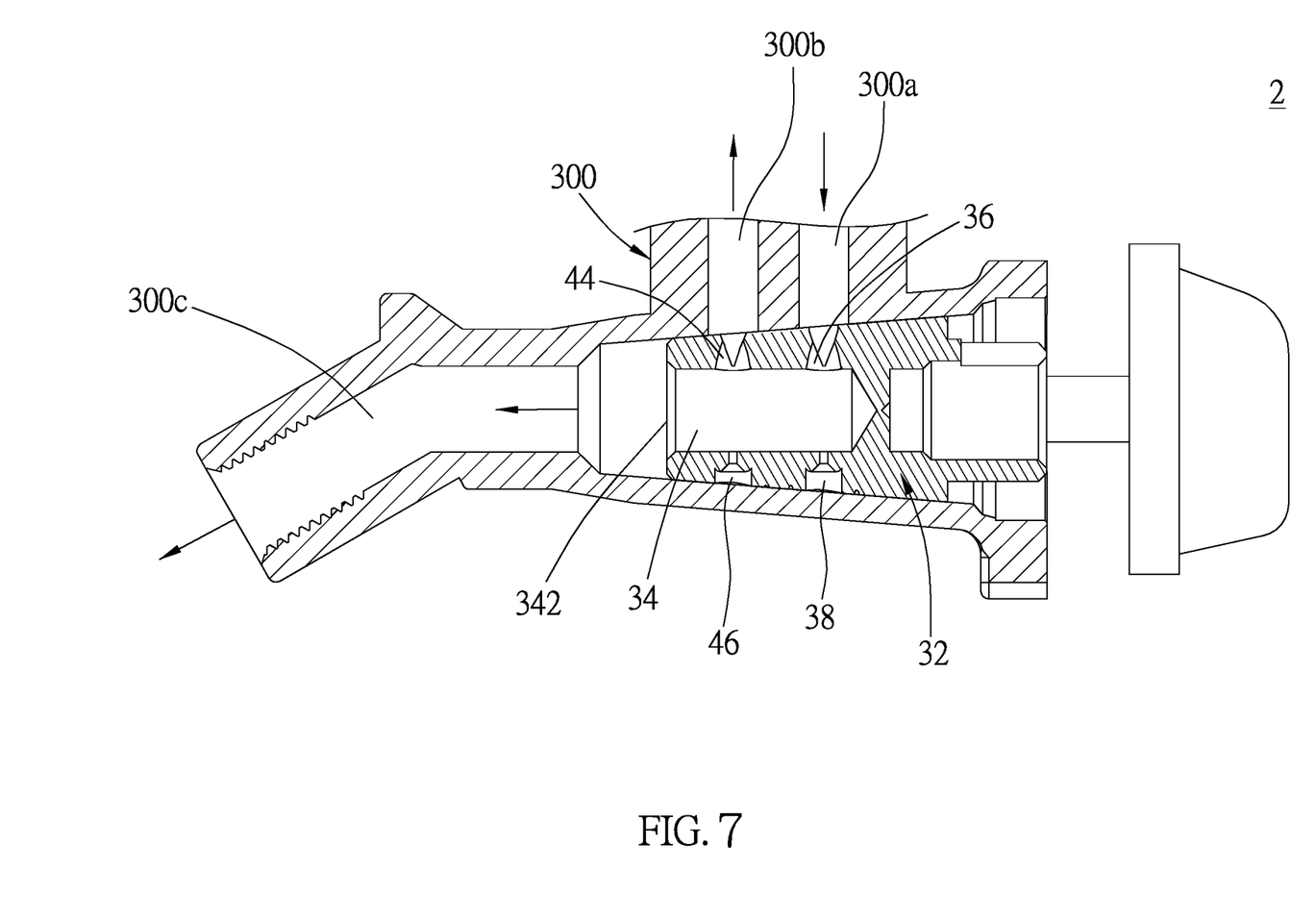
FIG. 7 is a sectional view of the gas valve applied with the plug member of a second embodiment of the present invention.

As shown in FIG. 7, a gas valve 2 with a plug member 32, which is a second embodiment of the present invention, has almost the same structure as said gas valve 1 with a plug member 32 of the first embodiment, except that a valve 300 of the gas valve 2 in the second embodiment has a first airway 300a, a second airway 300b, and a third airway 300c.

In the second embodiment, gas flows in the gas valve 2 through the first airway 300a, and flows out through the second airway 300b and the third airway 300c.

Figure 8:
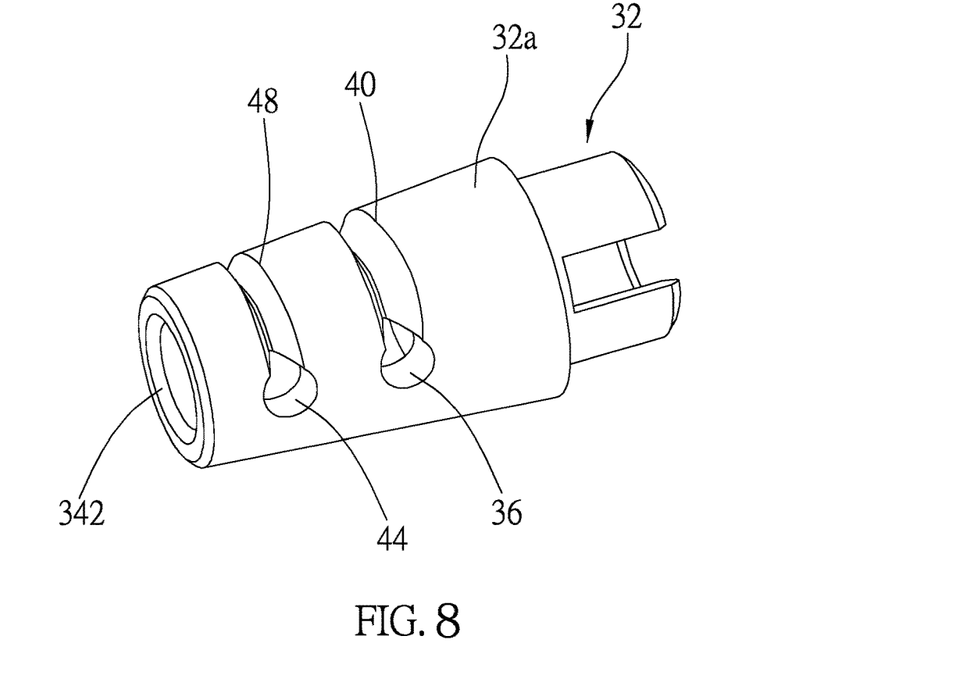
FIG. 8 is a perspective view of a plug member of the second embodiment.
Figure 9:
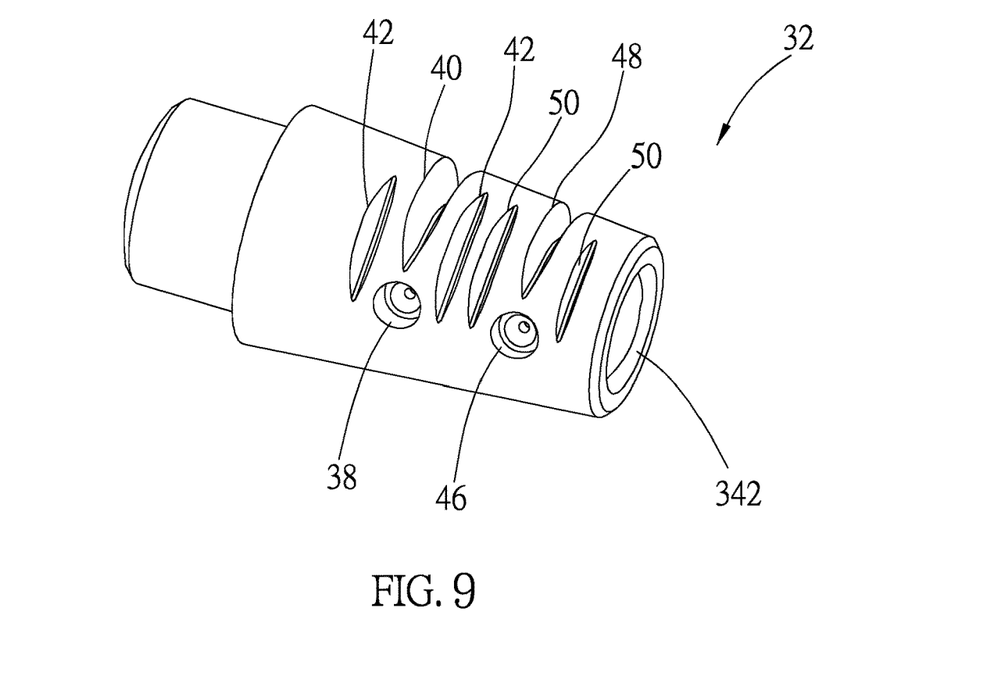
FIG. 9 is a perspective view, showing the plug member in another direction of the second embodiment.
Figure 10:
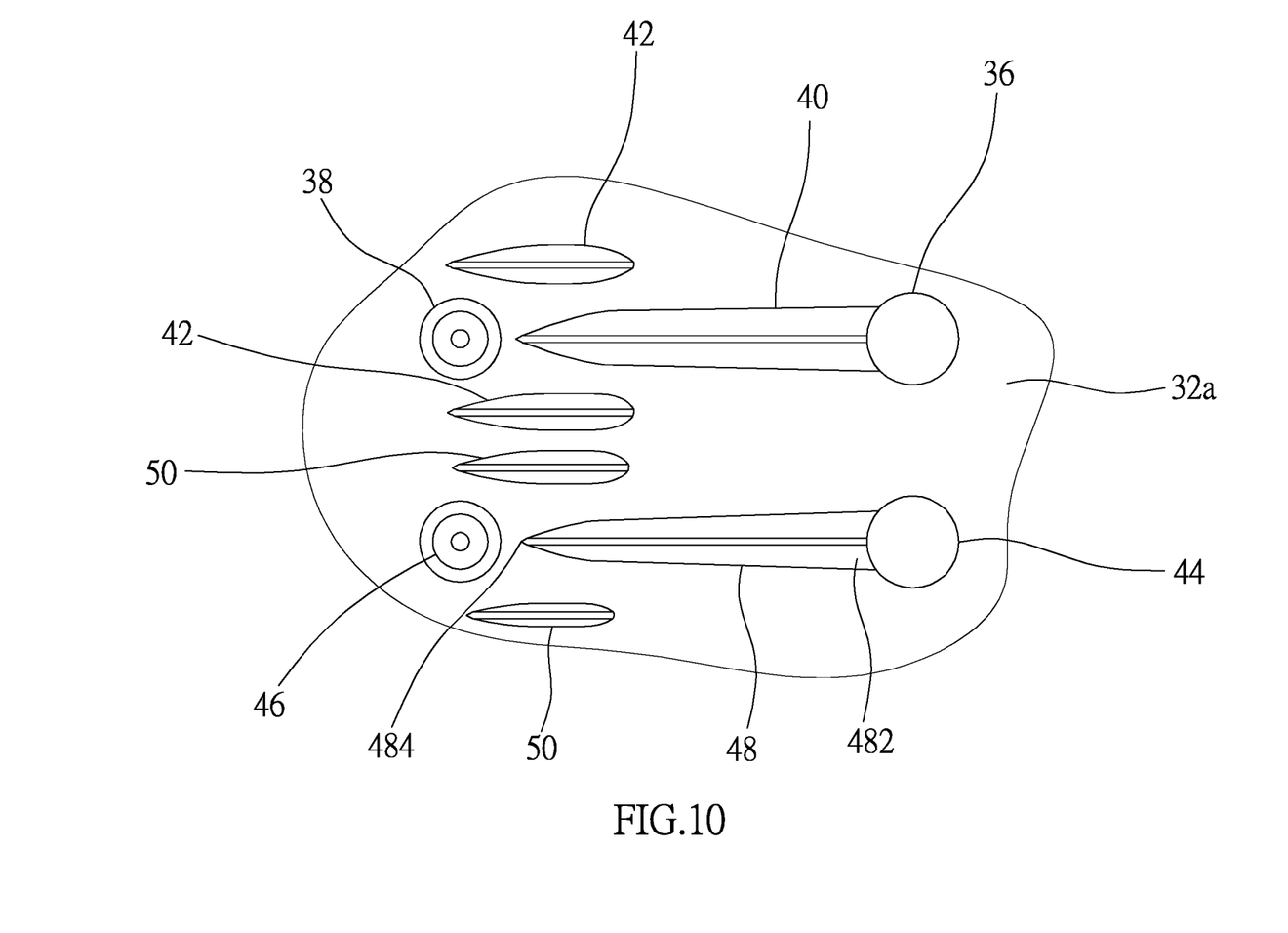
FIG. 10 is a partial expanded view of the outer peripheral surface of the plug member of the second embodiment.

As shown in FIGS. 8-10, the plug member 32 of the second embodiment, has almost the same structure as said plug member 20 of the first embodiment, wherein the difference between these two embodiments is that the second embodiment has not only a first bore 36, a second bore 38, a first guiding slot 40, a first oil groove 42, but also a third bore 44, a fourth bore 46, a second guiding slot 48, and at least one second oil groove 50, wherein the third bore 44 and the fourth bore 46 are located in a radial direction of the plug member 32, and on an outer peripheral surface of the plug member 32 between the first oil groove 42 and an open end 342 of an axial bore 34; the second guiding slot 48 and the at least one second oil groove 50 are recessed into the outer peripheral surface 32a of the plug member 32. The number of the at least one second oil groove 50 is two in the second embodiment.

The third bore 44 and the fourth bore 46 communicate with the axial bore 34, respectively, wherein a diameter of the third bore 44 is larger than a diameter of the fourth bore 46. The second guiding slot 48 extends from the third bore 44 to the fourth bore 46. The second guiding slot 48 has a first end 482 and a second end 484, wherein the first end 482 of the second guiding slot 48 communicates with the third bore 44. The second end 484 of the second guiding slot 48 is near the fourth bore 46 without physically communicating with the fourth bore 46. A width of the second guiding slot 48 decreases gradually from the first end 482 to the second end 484 to form a tip at the second end 484 of the second guiding slot 48.

The second oil groove 50 is near the second end 484 of the second guiding slot 48 without physically communicating with the second guiding slot 48 or the fourth bore 46. In the second embodiment, both the second oil grooves 50 are parallel to the axial direction of the plug member 32, wherein the second end 484 of the second guiding slot 48 is located between the second oil grooves 50. Preferably, the second end 484 of the second guiding slot 48 and part of the fourth bore 46 are located between the second oil grooves 50. The second oil grooves 50 are long and narrow, and a long axial direction of each of the second oil grooves 50 is parallel to an extending direction of the second guiding slot 48, the first guiding slot 40, and the first oil grooves 42. In the second embodiment, while rotating the plug member 32, both the second oil grooves 50 do not enter a projection area of the third airway 300c. However, in practice, at least one part of each of the second oil grooves 50 could also enter the projection area of the third airway 300c while the plug member 32 is being rotated.

The first bore 36, the second bore 38, and the first guiding slot 40 correspond to the first airway 300a of the valve 300. The third bore 44, the fourth bore 46, and the second guiding slot 48 correspond to the third airway 300c. Thereby, different gas flow could be respectively flowed out through the second airway 300b and the third airway 300c of the gas valve 2 at the same time. While rotating the plug member 32, the gas flow flowing out through the second airway 300b and the third airway 300c could be linearly regulated. The oil grooves 50 could effectively avoid accumulating too much lubricant in the second end 484 of the second guiding slot 48, which prevents the gas flow flowing through the third airway 300c from dropping dramatically or being cut off while rotating the plug member 32.

Figure 11:
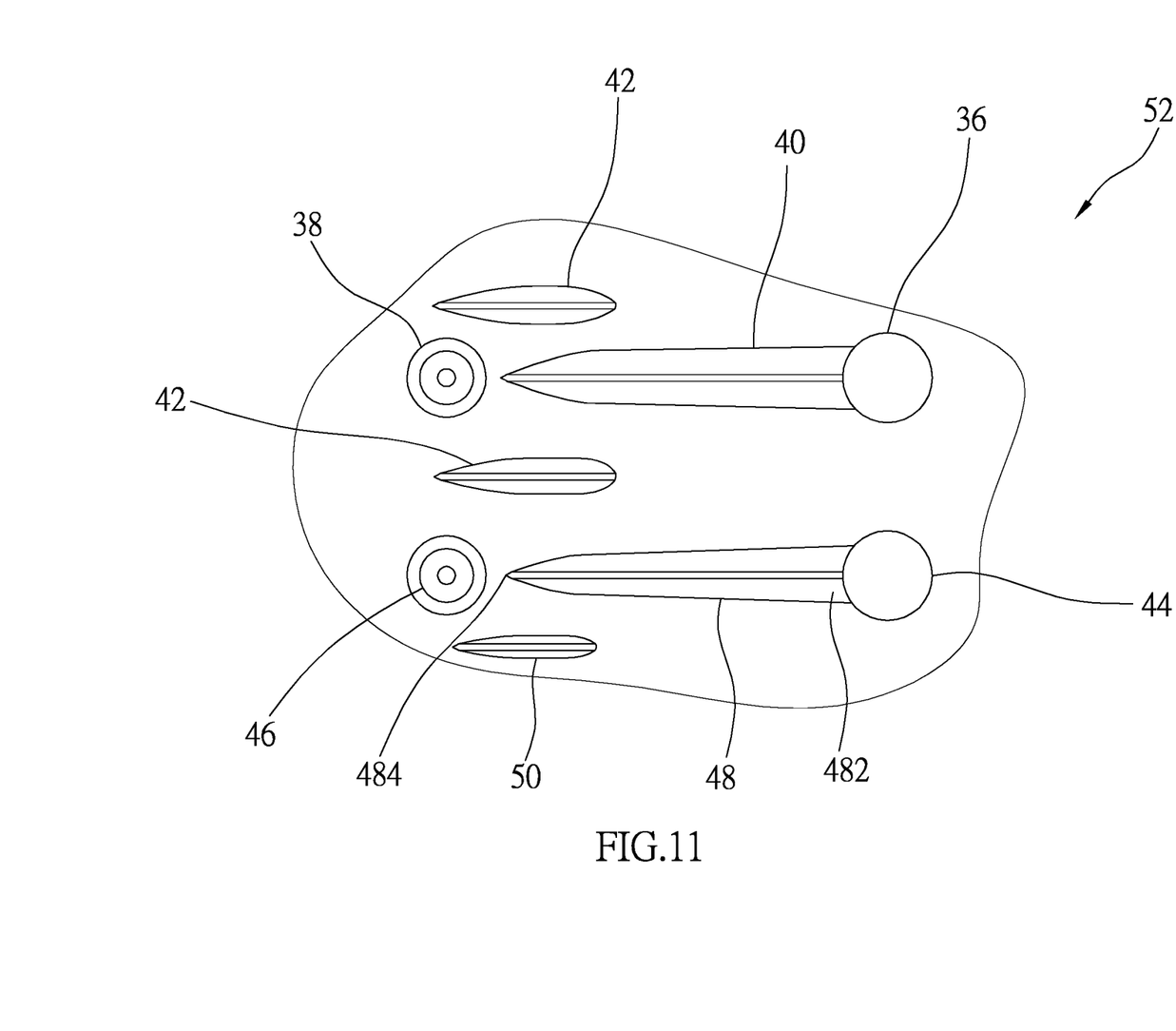
FIG. 11 is a partial expanded view of the outer peripheral surface of the plug member of a third embodiment.

As shown in FIG. 11, a plug member 52 of a third embodiment of the present invention has almost the same structure as said plug member 32 of the second embodiment, except that the number of the at least one second oil groove 50 is one. The second end 484 of the second guiding slot 48 and part of the fourth bore 46 are located between the first oil groove 42 and the second oil groove 50.

Figure 12:
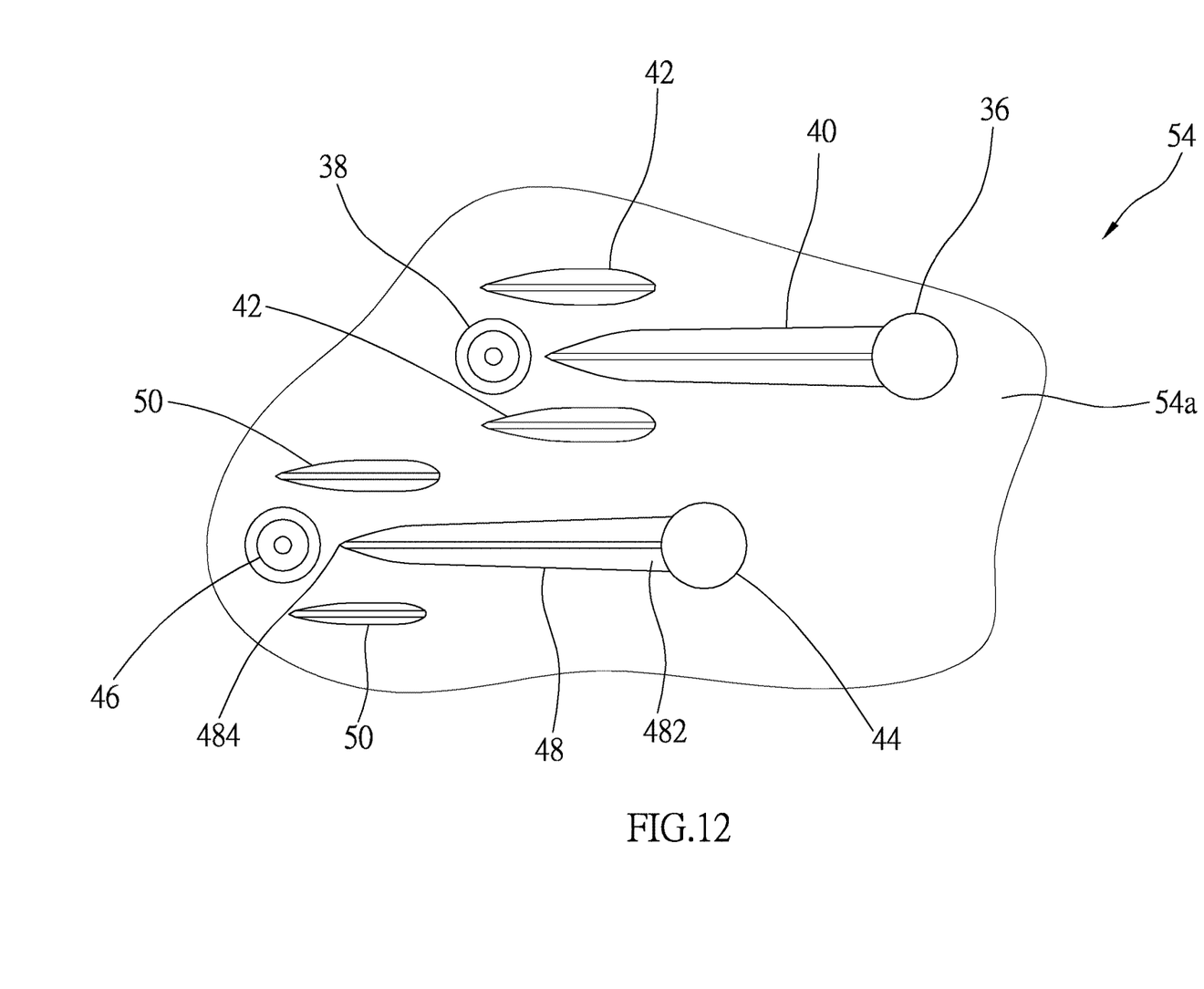
FIG. 12 is a partial expanded view of the outer peripheral surface of the plug member of a fourth embodiment.

As shown in FIG. 12, a plug member 54 of a fourth embodiment of the present invention, again, has almost the same structure as said plug member 32 of the second embodiment, except that the third bore 44 and the first bore 36 in the fourth embodiment are staggered in an axial direction of the plug member 54. The second bore 38 and the fourth bore 46 are staggered in the axial direction of the plug member 54, and the second bore 38 is located between the third bore 44 and the fourth bore 46 in a direction of the circumference of the outer peripheral surface 54a.

In conclusion, the plug members of the present invention could avoid accumulating too much lubricant in the second end of the first guiding slot or the second guiding slot by further providing at least one oil groove, which is adapted to receive excessive lubricant. Whereby, the gas flow flowing through the third airway 300c is prevented from dropping dramatically or being cut off while rotating the plug member 32. It is noted that the tip formed by the second end of the first guiding slot or the second guiding slot could reduce the chance of accumulating too much lubricant in the second end of the first guiding slot or the second guiding slot. As a result, the plug member could rotate smoothly since the lubricant would not be removed too much. In practice, the width of the guiding slot in each embodiment could be decreased gradually, the same width, or partially decreased gradually.

It must be pointed out that the embodiments described above are only some embodiments of the present invention. All equivalent structures which employ the concepts disclosed in this specification and the appended claims should fall within the scope of the present invention.

What is claimed is:

1. A plug member of a gas valve, having an axial bore located in an axial direction thereof, a first bore, and a second bore, wherein the first bore and the second bore are located in a radial direction of the plug member; the first bore and the second bore communicate with the axial bore, respectively; a diameter of the first bore is larger than a diameter of the second bore; the plug member is characterized in that:
a first guiding slot and at least one first oil groove are recessed into an outer peripheral surface of the plug member, wherein the first guiding slot extends in a direction from the first bore toward the second bore; the first guiding slot has a first end and a second end, wherein the first end communicates with the first bore, while the second end is near the second bore without physically communicating with the second bore; the at least one first oil groove is near the second end of the first guiding slot without physically communicating with the first guiding slot or the second bore;
wherein an extension line on the outer peripheral surface of the plug member extending from the second end of the first guiding slot to the axial direction of the plug member is defined to pass through the at least one first oil groove.

2. The plug member of claim 1, wherein the at least one first oil groove is long and narrow, and a long axial direction of the at least one first oil groove is parallel to an extending direction of the first guiding slot.

3. The plug member of claim 1, wherein the second end of the first guiding slot is a tip.

4. The plug member of claim 1, wherein the at least one first oil groove comprises two first oil grooves, and both the first oil grooves are parallel to the axial direction of the plug member; the second end of the first guiding slot is located between the first oil grooves.

5. The plug member of claim 4, wherein the second end of the first guiding slot and part of the second bore are located between the first oil grooves.

6. The plug member of claim 4, further comprising a third bore and a fourth bore, which are located in the radial direction of the plug member; the third bore and the fourth bore communicate with the axial bore, respectively; a diameter of the third bore is larger than a diameter of the fourth bore; a second guiding slot and a second oil groove are recessed into the outer peripheral surface of the plug member, wherein the second guiding slot extends from the third bore to the fourth bore, and has a first end communicating with the third bore; a second end near the fourth bore without physically communicating with the fourth bore; the second oil groove is near the second end of the second guiding slot without physically communicating with the second guiding slot or the fourth bore; the second end of the second guiding slot and part of the fourth bore are located between one of the at least one first oil groove and the second oil groove.

7. The plug member of claim 6, wherein the second oil groove is long and narrow; a long axial direction of the second oil groove is parallel to an extending direction of the second guiding slot.

8. The plug member of claim 6, wherein the second end of the second guiding slot is a tip.

9. The plug member of claim 1, further has a third bore and a fourth bore, which are located in the radial direction of the plug member; the third bore and the fourth bore communicate with the axial bore, respectively; a diameter of the third bore is larger than a diameter of the fourth bore; a second guiding slot and at least one second oil groove are recessed into the outer peripheral surface of the plug member, wherein the second guiding slot extends from the third bore to the fourth bore, and has a first end communicating with the third bore; a second end near the fourth bore without physically communicating with the fourth bore; the at least one second oil groove is near the second end of the second guiding slot without physically communicating with the second guiding slot or the fourth bore.

10. The plug member of claim 9, wherein the at least one second oil groove comprises two second oil grooves; both the second oil grooves are parallel to the axial direction of the plug member; the second end of the second guiding slot is located between the second oil grooves.

11. The plug member of claim 10, wherein the second end of the second guiding slot and part of the fourth bore are located between the second oil grooves.

12. The plug member of claim 9, wherein the third bore and the first bore are staggered in the axial direction of the plug member, while the second bore and the fourth bore are staggered in the axial direction of the plug member, and the second bore is located between the third bore and the fourth bore in a direction of the circumference of the outer peripheral surface.

* * * * *